Figure 1:
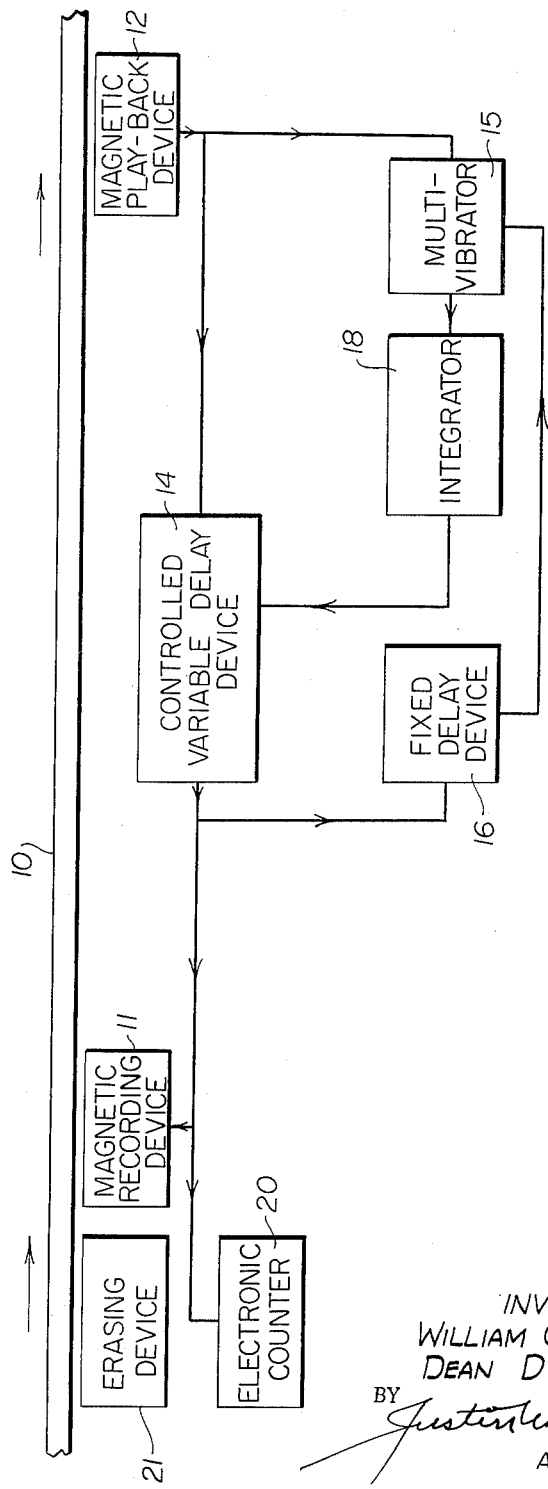

INVENTORS.
WILLIAM C. GEORGE
DEAN D. RIGGS
BY
ATTORNEY

INVENTORS.
WILLIAM C. GEORGE
DEAN D. RIGGS
BY
ATTORNEY

INVENTORS.
WILLIAM C. GEORGE
DEAN D. RIGGS.

ATTORNEY

United States Patent Office 3,015,062
Patented Dec. 26, 1961

3,015,062
MEASURING DEVICE
William C. George, Parma, and Dean D. Riggs, Avon Lake, Ohio, assignors to Designers For Industry, Inc., Cleveland, Ohio, a corporation of Ohio
Filed May 21, 1959, Ser. No. 814,932
11 Claims. (Cl. 324—34)

This application is a continuation-in-part of our former application, Serial No. 779,167, filed December 9, 1958, and entitled "Measuring Device," and now abandoned.

This invention relates generally to measuring devices and is particularly directed to a device for measuring a length dimension in a predetermined path in a substance. The device has a particular utility in measuring the length of steel strip in a tin plate mill.

In certain applications it is desired to measure a length dimension in a predetermined path in a substance under conditions which make a physical measurement of the ordinary type of such a dimension impractical. For example, it may be desirable to measure the length of a strip of steel in a rolling mill or a strip of steel where a tin plating operation is being performed. In such a situation, the steel strip may be traveling at a high rate of speed (e.g., 2000 feet per minute) and it thus becomes very difficult accurately to measure a given length of the material.

It has been proposed to measure the length of a wire running between two reels by means of a magnetic marking device which marks the wire and by the provision of a magnetic sensing device which senses the magnetic mark. In the arrangement under consideration, the sensing of the mark is used to provide an additional magnetic mark which, in turn, is sensed by the sensing device. A counter device which counts the number of magnetic marks sensed gives an indication of the length of wire.

An arrangement of the type under consideration here is disclosed in United States Letters Patent Number 2,488,277, granted on November 15, 1949, on an application filed by Charles J. Falk, Richard K. Fairley and Thomas T. Short. The arrangement of the Falk et al. patent provides a number of safeguards to insure a satisfactory operation of the basic system. Thus, there is disclosed a gain-controlled amplifier in the circuit between the sensing device and the wire marking device which is intended to prevent the operation of the system by noise pulses under certain conditions of operation. The variable gain amplifier is also said to be effective to prevent the operation of the system in case double-pulse operation is started for any reason. The arrangement also includes an arrangement for introducing a starting pulse into the system in case, for any reason, the system ceases to operate for the lack of a recorded pulse in the system. There is also provided a delay circuit which retards the application of the starting pulse when the system is being placed in operation so as to compensate, at least in part, for the inaccuracy in the system during the starting interval.

In considering the operation of the system which has just been described, it will be seen that there is thus provided a method for accurately measuring, under certain conditions, the wire footage as intended. However, in considering the system in more detail, it will be seen that the time interval between the marking pulses on the wire involves the time of travel of a marking pulse from the recording head to the sensing head plus whatever electrical time delay there is in the system. A further consideration will result in the conclusion that, since the electrical delay in the system is substantially a constant while the time interval between the recording and the sensing of a pulse varies with the velocity of the wire, the system can only provide an accurate measurement of footage if it is calibrated for one wire velocity. This is very disadvantageous where it is necessary under certain conditions to provide a variable speed drive. It therefore becomes apparent that it would be highly desirable to provide a measuring system of the general type under consideration here which is not subject to inaccuracies because the speed of the steel strip is varied.

It is an object of the present invention, therefore, to provide an improved device for measuring a length dimension in a predetermined path in a substance.

It is a further object of the invention to provide an improved length measuring device in which the measurements can be made at a very high rate of speed and without the making of a physical contact with the substance to be measured.

It is another object of the invention to provide an improved device for measuring a length dimension in a predetermined path in a substance which is being driven in the path under consideration at a high speed which may vary while the measurements are being made.

It is still another object of the invention to provide an improved device for counting successive incremental length measurements in a predetermined path in a substance.

In accordance with the invention, a device for measuring a length dimension in a substance moving in a predetermined path with a variable velocity comprises marking means for providing a point of reference having a predetermined space relationship in said substance with respect to said marking means and sensing means for sensing the point of reference when this point has a predetermined spacing in said path from the position at which said point of reference was provided by said marking means. There is also provided a means responsive to each point sensed by the sensing means as relative motion in said path is provided between the substance to be measured on the one hand and the marking means and the sensing means on the other hand for causing the marking means to provide another point of reference in the substance after a time delay which is dependent upon the velocity of movement of said point of reference in said path to adjust the measured values for the velocity variations in said substance, together with means for counting the points sensed by the sensing means to determine the length dimension in the predetermined path.

In a further embodiment of the invention, the arrangement just described includes a means for counting the points sensed by the sensing means to determine the length dimension in the predetermined path with an accuracy which is compensated at all values of relative motion for the total time delay of the system.

For a better understanding of the present invention together with other and further objects thereof, reference is had to the following description taken in connection with the accompanying drawings, and its scope will be pointed out in the appended claims.

Figure 2:
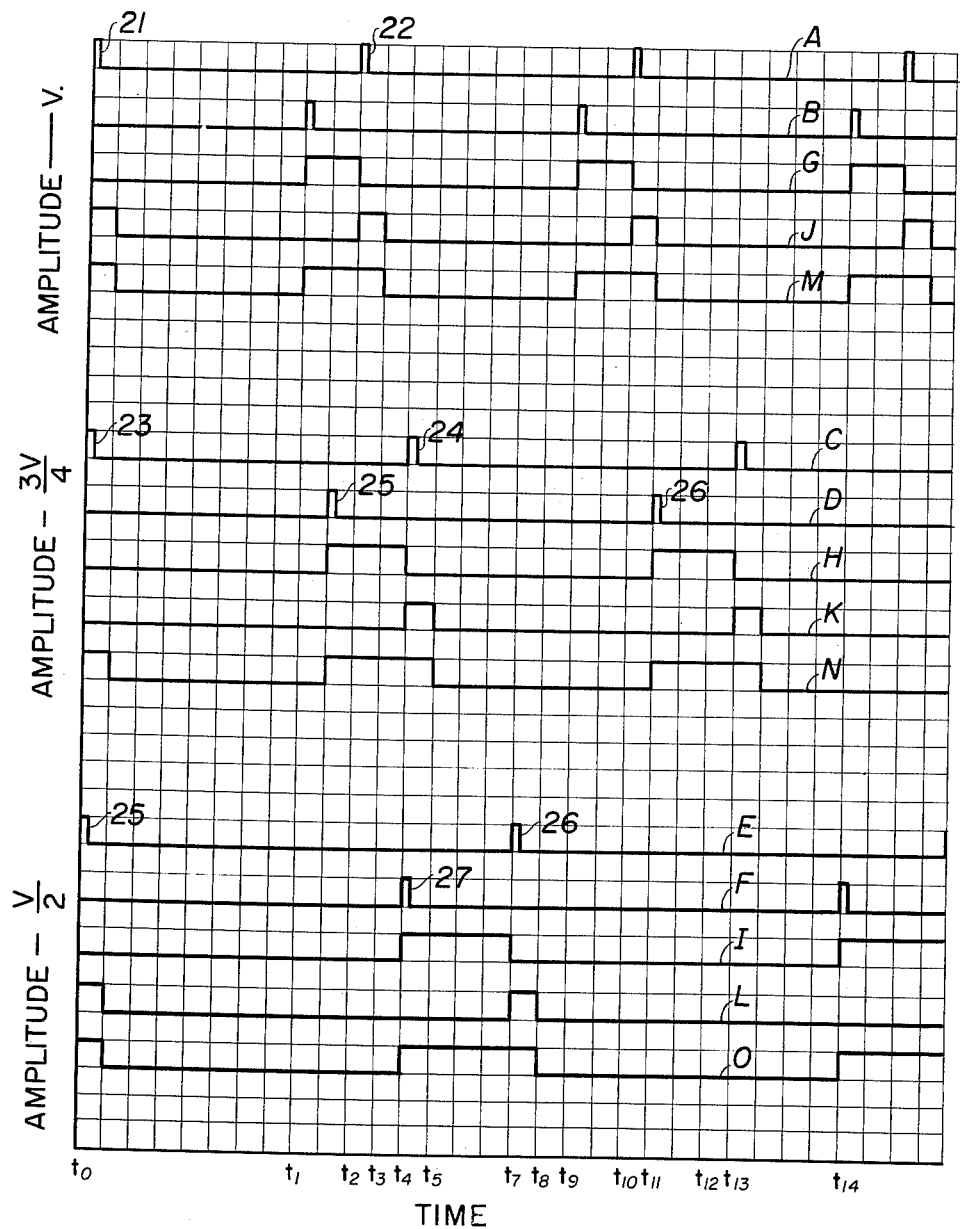

FIG. 1 is a block diagram of a device in accordance with the present invention which is used for measuring tin plated strip steel as it is being moved at a variable rate of speed from one point to another;

FIG. 2 comprises graphs which are used in explaining the operation of the FIG. 1 embodiment of the invention;

While FIGS. 3, 4, 5, and 6 illustrate circuits which can be used in different portions of the arrangement of FIG. 1.

Referring now more particularly to FIG. 1 of the drawing, there is shown a portion of a steel strip 10 which is being moved in the direction indicated by the arrow at a variable rate of speed during one of the process steps in the manufacture of the steel. For the purpose of providing an arrangement for measuring the length of the steel, there is provided in the FIG. 1 embodiment a system of electronic components, which are shown in block form. These include a magnetic recording device 11, which may be of any type and which has the function of applying a magnetized point of reference to the steel strip 10, which point of reference has a predetermined space relationship in the strip 10 with respect to the magnetic recording device 11. The device 11 thus becomes a means for marking the steel strip with a magnetized point of reference. The magnetic recording device 11 is preferably adapted to have applied thereto a series of pulses, as will be hereinafter described, and in response to each such pulse, the marking device 11 causes a magnetic recording head included within the device and adjacent the steel strip 10 to be energized for the duration of the pulse, thereby to provide the magnetized point of reference on the steel strip 10.

There is also provided in the arrangement of FIG. 1 a means for sensing the magnetized point of reference provided in strip 10 by the device 11 when this point has a predetermined spacing in the path of the steel strip from the position at which the point of reference was provided by the marking device 11. This means comprises a magnetic play-back device 12 which is spaced from the magnetic recording device 11 by a predetermined amount, thus to provide a predetermined spacing between the points at which the magnetic reference points are provided by the device 11 and at which the magnetic play-back device senses these magnetized points. The magnetic play-back device may be completely conventional, and may include a magnetic recording head of conventional type, spaced in proximity to the steel strip 10 so as to have induced therein, during the passage of the magnetized portion of the strip 10, a voltage which is amplified and supplied to other elements of the system, as will be hereafter described.

The output signal of the magnetic play-back device 12 thus becomes a series of signals which depend upon the series of magnetic reference points provided by device 11 and which are in turn applied through a controlled variable delay device 14 to the input circuit of device 11.

The system of FIG. 1 also includes a multivibrator 15 connected to the output circuit of magnetic play-back device 12. There is also connected to an input circuit of multivibrator 15, a signal from the output circuit of the variable delay device 14, this signal being applied through a fixed delay device 16. The multivibrator 15 is of a type which is conventional and which is adjusted to operate so that one of the tubes therein becomes conductive upon the application of a pulse to multivibrator 15 from the magnetic play-back device 12, and so that this same tube becomes non-conductive upon the application thereto of a pulse from variable delay device 14 through the fixed delay device 16. The multivibrator 15 is adjusted to generate a pulse which starts when a pulse is received from device 12 and which stops when the pulse from device 16 terminates. This can be done in a manner well understood by those skilled in the art by differentiating the pulses so that the device 15 is responsive to the leading edge of pulses from device 12 and to the lagging edge of pulses from device 16.

The output signal from multivibrator 15 is applied through an integrator 18 to control the delay provided by the device 14 in accordance with the integrated value of the output of multivibrator 15. The integrator 18 may be of any conventional type. It may include, for example, a simple diode circuit having a capacitor shunted by a resistor, the time constant being long with reference to the period of the pulses to be integrated, so that the pulses involved are integrated over the time interval thus provided to provide a D.C. voltage for controlling the delay device 14.

The device 14 can also be of a conventional type. For example, it can be the type of circuit which is known as a Phantastron, and which is effective to provide pulses of variable width depending upon the amplitude of a D.C. voltage which is applied to the device.

There is also provided in the circuit of FIG. 1 an electronic counter 20 which is connected to the input circuit to magnetic recording device 11. The electronic counter again may be of any conventional type which counts the number of pulses applied to its input circuit.

An erasing device 21 is provided in the FIG. 1 arrangement for conditioning the steel strip 10 so that the only magnetized portions sensed by the magnetic play-back device 12 are those provided by the magnetic recording device 11.

In considering the operation of the FIG. 1 device, it will first be assumed that no delay is provided by the device 14. Furthermore, it will be assumed that the steel strip 10 is being moved to the right, as indicated by the arrow, at a high rate of speed, and that the system has been placed in operation by causing the magnetic recording device 11 to provide a short magnetized portion in steel strip 10. This can be done by momentarily energizing the head of magnetic recording device 11 to provide a pulse of current thereto. Under these conditions, the magnetized portion of the steel strip 10 moves towards the magnetic play-back device 12 and is sensed by the magnetic play-back device when it is in close proximity thereto. This provides a pulse in the output circuit of magnetic device 12, which is again applied through the device 14 to the magnetic recording device 11. This pulse, applied to the input circuit of the device 11, in turn, causes a new magnetized point of reference to be provided on steel strip 10 because of the fact that the magnetic head of device 11 provides a short magnetized strip in the steel. This newly magnetized portion in turn moves down the strip and is sensed in the manner before described, and another pulse is again applied to the recording device 11 in the same manner.

Under the conditions assumed, specifically that there is no delay whatever in the system, the number of pulses present at the input circuit to device 11 determines the number of strips of steel corresponding to the length between the device 11 and the device 12 in a manner which is readily apparent. Thus, the electronic counter is provided for the purpose of counting the pulses corresponding to such strips, and the total provided by the electronic counter thus provides an indication of the total length of steel strip which passes the magnetic recording device 12 during the interval of interest.

In considering the operation of the FIG. 1 device as so far described in further detail, it will be seen that any error in the spacing of the magnetic recording device 11 with respect to the magnetic play-back device 12 will cause an error to appear in the system. Also, it will be seen that any electrical delay in the system will cause an error to appear in the measurements. Thus, the distance D between measured points on the steel strip or between successive points of reference provided by the marking device 11 is represented by the following equation:

$$D = S + tV \qquad (1)$$

where D is the measured distance; S is the distance between the magnetic recording device 11 and the magnetic play-back device 12; $t$ is the time delay in the electrical system between the sensing of a magnetic reference point by magnetic play-back device 12 and the time when the succeeding pulse is applied to the steel strip 10 by the magnetic recording device 11; and where V is the velocity of the steel strip 10.

If T is the time between an output pulse from device 11 and the sensing of the pulse by the device 12, then:

$$D = (T+t)V \quad (2)$$

However, $$V = \frac{S}{T} \quad (3)$$

If D is to be a constant, the substitution of V from Equation 3 into Equation 2 provides:

$$D = \frac{(T+t)S}{T} \quad (4)$$

From Equation 4 it follows:

$$\frac{D}{S} = \frac{(T+t)}{T} \quad (5)$$

Therefore, the time condition for a constant distance measurement D in the system of FIG. 1 is given by the following expression:

$$k = \frac{T+t}{t} \quad (6)$$

where $k$ is also a constant.

If it is assumed that the velocity $V_1$ of the steel strip is at or beyond the maximum velocity incurred in the operation of the device, then the last equation is satisfied by the pulses of the curves of FIG. 2. In this case, curve A represents the pulses actually applied to the steel strip 10 at the velocity $V_1$, and the curve B represents the corresponding pulses actually sensed by the magnetic play-back device 12. It will be seen, therefore, that the pulse 21 is applied to the steel strip 10 at time $t_0$, and that at time $t_1$, this pulse is sensed by the play-back device 12. Due to the delay in the electrical pulses of the system, however, the pulse received at time $t_1$ (curve B) does not cause another pulse to be applied to the steel strip 10 by the magnetic recording device 11 until the time $t_2$ and, thereafter, the pulses are correspondingly repeated. The interval $t_2-t_1$, therefore, represents the delay time in the system from the receipt of a pulse by device 12 until the succeeding pulse 22 is applied to the steel strip 10.

Referring now to curve C, there are shown corresponding pulses under the condition that the steel strip 10 is slowed to three-quarters of the speed $V_1$. The pulses occurring on the steel strip 10 in this case are designated by numerals 23 and 24, while the pulses received by the magnetic play-back device 12 are represented by the pulses 25 and 26 of curve D. The timing of the pulses of curves C and D are also made to satisfy the Equation 6 above. In this case, it will be seen that the interval between the receipt of a pulse by the magnetic play-back device 12 and the application of the succeeding pulse to the steel strip 10 by the device 11 is increased over the interval shown in curves A and B.

A corresponding set of curves is shown in E and F for the condition where the velocity of the steel strip is one-half $V_1$. Here again, the pulses 25 and 26 represent pulses as applied to the steel strip 10 by the magnetic recording device 11, and the pulse 27 represents one of the received pulses. Thus, the delay in the system in this case, in order to satisfy the conditions of Equation 6 above, is the time interval between pulses 27 and 26, and is seen to be greater than in the cases shown above.

The curves G, H, and I thus represent pulses of the time intervals which are required in the electrical delay in the system if there is to be no error in the counting by the device 20.

Considering now the FIG. 1 circuit, it is the function of variable delay device 14 to provide a variable time delay in the system which varies with the velocity of the steel strip 10 and which satisfies the conditions of Equation 6.

Considering, as an example, the pulse 22 of curve B, it will be seen that this pulse is applied to the fixed delay device 16 at the time $t_2$, and that after an interval $t_3-t_2$ corresponding to the delay of device 16, the pulse generated by delay device 16 terminates. The pulses generated by the delay device 16 for the speeds under consideration in FIG. 2 are shown by curves J, K, and L, respectively. The termination of the pulse generated by device 16 is used to control a tube in multivibrator 15 so that the pulses generated by multivibrator 15 are, for the speeds under consideration, shown by curves M, N, and O, respectively. These pulses are integrated and compared to a fixed reference by device 18 and the resultant signal is used to control the variable delay device 14 to produce the proper delay in the system for the velocity of the steel strip 10 which is involved. Accordingly, a control is provided for the device 14 which provides the required time delay under all conditions of operation.

Considering the operation from another standpoint, it will be seen that a time delay corresponding to the pulses of curve G is provided for the highest operating speed $V_1$, and that corresponding time delays, as shown by curves H and I, are provided for increasingly lower speeds.

It will be apparent that the counter 20 can be connected into the system at various other points instead of at the input to the magnetic recording device 11, as shown. For example, the counter can be connected to the output circuit of device 12.

It will also be understood that suitable pulse shaping and power amplifiers can be included in the system as needed, in a manner well understood by those skilled in the art.

It will be seen that the counter 20 constitutes a means for counting the points sensed by the sensing means 12, to determine the length dimension in the steel strip 10 with an accuracy which is compensated at all values of the motion of steel strip 10 for the total time delay in the system. It will be seen that the device 14 comprises a means for introducing additional time delay into the system, for compensating for the effects of variations in the speed of the steel strip 10 upon the accuracy of the length dimension which is measured by the system. It will be seen further that the controlled variable delay device 14 is controlled in accordance with decreases in the speed of the steel strip 10 in order to effect the desired compensation.

It will be apparent, for example, by reference to curves A and E that the frequency of the pulses in the system increases with increasing speeds in the system. It will thus be apparent that this increase in the frequency of the pulses can be used to provide a controlled variable delay in device 14 which depends upon the speed of the steel strip 10. In fact, there are many ways in which a control effect, which varies with the speed and in the desired direction, can be obtained.

While a device has been shown which operates on magnetic recording principles, it will be understood that various other ways of marking the substance to be measured and in sensing the marked points can be used. Thus, a physical marking can be used, together with an optical sensing device, as an example.

A different relationship can be derived from the equations given above. By dividing Equation 1 above by V we obtain:

$$\frac{D}{V} = \frac{S}{V} + t \quad (7)$$

It will be seen that $$\frac{D}{V}$$

is the time interval between pulses in the electrical system disclosed or the time interval between the pulses of curves A, C, and E of FIG. 2, which can be designated by $T_D$. Similarly, $$\frac{S}{V}$$

is the time interval between the recording of a pulse by the recording head and the sensing of the pulse by the receiving head or the time interval represented by curves B, C, and F of FIG. 2, which can be called $t_S$.

Thus, Equation 7 becomes:

$$T_D = t_s + t \quad (8)$$

or $$1 = \frac{t_s + t}{T_0} \quad (9)$$

In considering Equation 9 it will be seen that, where the velocity of the strip 10 is variable, the times $t_s$ and $T_D$ also vary. Therefore, the present invention involves the concept of adding or subtracting an increment of time from the value $t$, which compensates for variations in velocity of the system so that the relationship of Equation 9 is always satisfied.

In the above discussion, we have considered the distance $s$ between the recording of a pulse, and the sensing of a pulse to be a linear function of the strip velocity. This is correct to a close approximation. However, because the usual sensing head depends upon the rate of velocity of the strip for its signal and because the amplitude at which the signal is sensed will generally be a constant, there is some error introduced into the system due to this factor. It will be seen that the system still provides an absolute accuracy if the parameter $T_D$ is considered to be a linear function of velocity and a factor $\Delta t$ is added or subtracted from the introduced time delay to compensate for the factor just mentioned. Of course, if a sensing head were used which did not depend for its amplitude value upon the velocity of the strip, the factor $\Delta t$ would not be present in the system.

While it is believed that circuits to carry out the measuring technique illustrated by the block diagram of FIG. 1 will be obvious to one skilled in the art, there will be given hereinafter, in FIGS. 3 to 6, inclusive, details of specific circuits which can be utilized.

Figure 3:
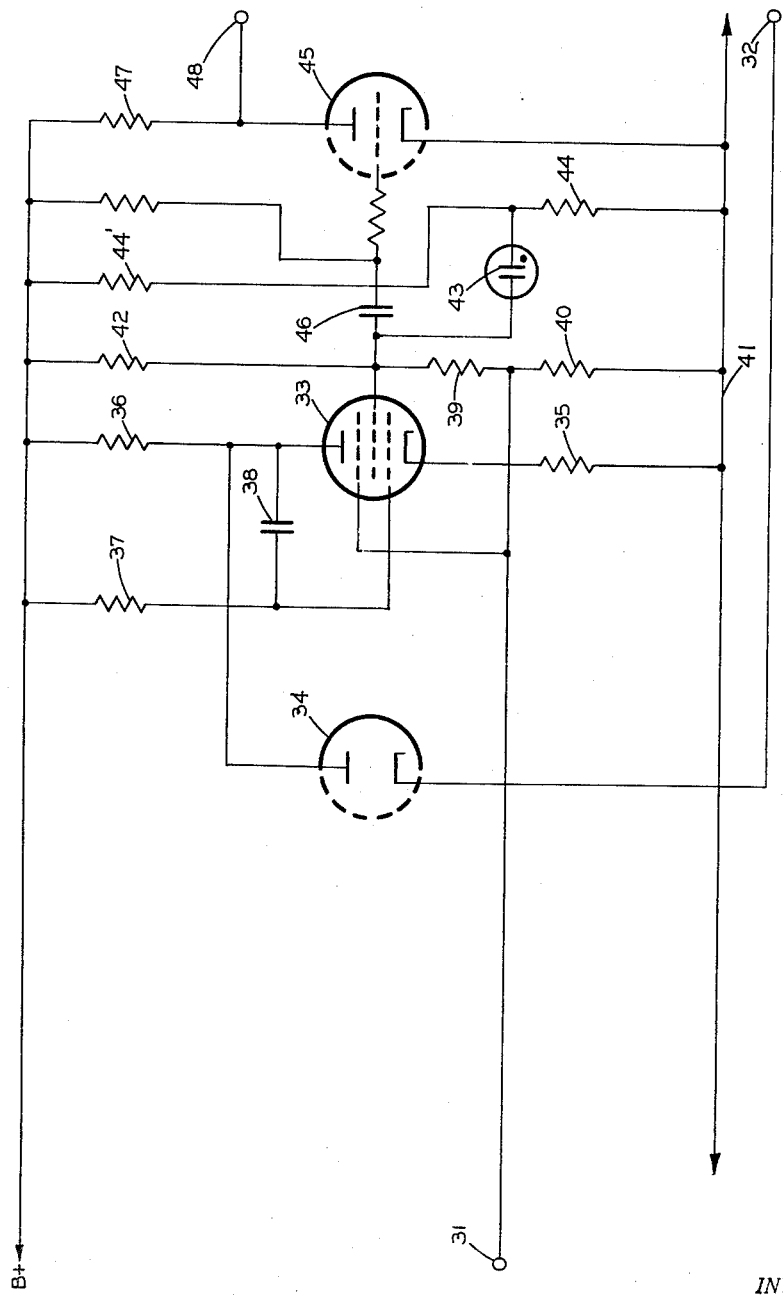

Referring to FIG. 3, there may be included within the controlled variable delay device the circuit which is there illustrated. Thus, in FIG. 3 the output signal from playback device 12 of FIG. 1 may be applied to a grid of a tube 33 through a terminal 31. The output from fixed delay device 16 is applied to the cathode of a diode 34 through the terminal 32. A cathode resistor 35 and an anode resistor 36 are provided for tube 33. The first grid of tube 33 is connected to the source of operating voltage +B for tube 33 through a resistor 37. A condenser 38 is connected between the anode and first grid of tube 33. The screen grid of tube 33 is connected to the junction of resistors 39 and 40 connected in series with resistor 42 between +B and a ground bus 41 which, in turn, is connected to other circuits as described hereinafter. The second grid of tube 33 is connected to +B through a resistor 42 and to the grid of a triode 45 through a condenser 46. The anode of tube 45 is connected to +B through a resistor 47 and directly to an output terminal 48. It will be understood that the pulse signals appearing at terminal 48 can be supplied to the fixed delay device 16 of FIG. 1 through a switching device.

Circuit constants which can be used in the circuit of FIG. 3 are as follows. A gas tube 43 is connected between the second grid of tube 33 and ground through a resistor 44. A resistor 44' is connected between the junction of tube 43 and resistor 44 and the source +B.

Tube 34 _____ Type ½ 6AL5.
Tube 33 _____ Type 6DB6.
Tube 45 _____ Type ½ 12AU7.

Resistor 37 _____ 1 megohm.
Resistor 36 _____ 330K.
Resistor 39 _____ 22K.
Resistor 42 _____ 22K.
Resistor 47 _____ 47K.
Resistor 35 _____ 3.9K.
Resistor 40 _____ 2.2K.
Resistor 42 _____ 22K.
Condenser 38 _____ 0.047 mf.
Condenser 46 _____ 0.001 mf.
Source of operating voltage +B ____ 250 volts.

Figure 4:
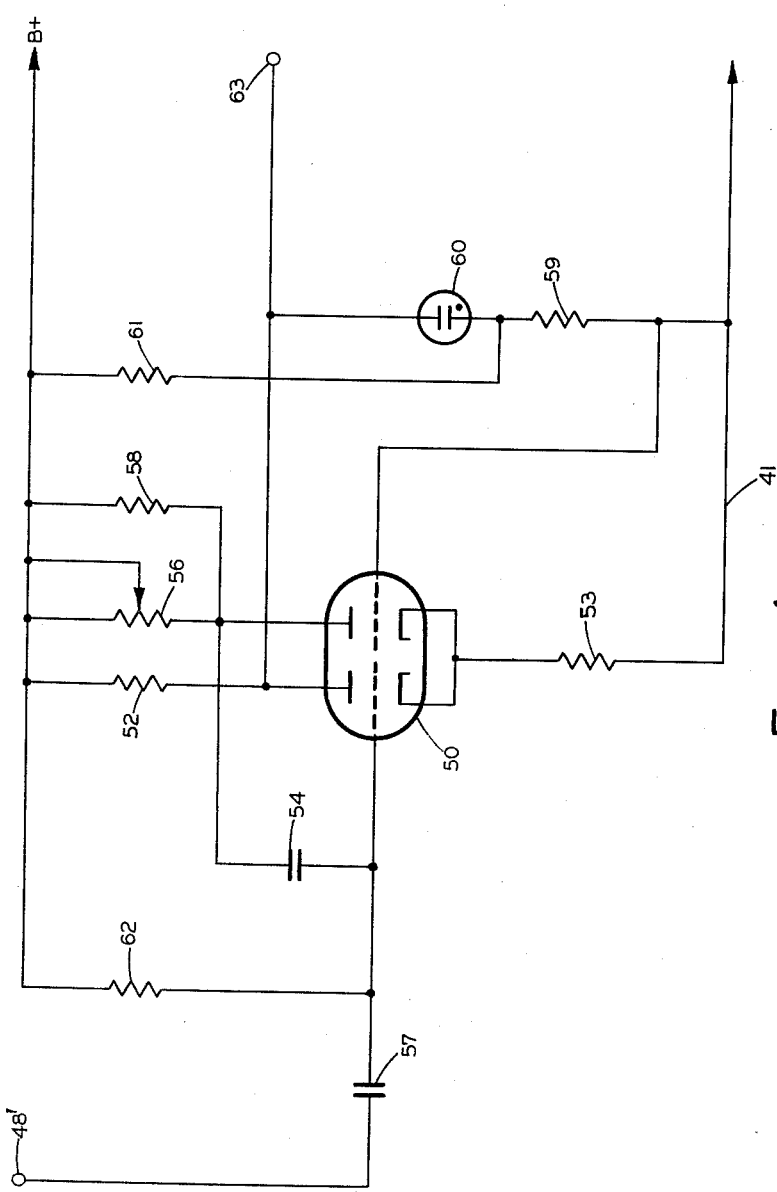

The circuit of FIG. 4 may be included in the block 16 of FIG. 1. Thus, the output from device 14 of FIG. 1 is, in the circuit of FIG. 4 applied to one control grid of a double triode 50 through a terminal 48' and condenser 57. The terminal 48' is so designated to indicate that the signal applied thereto can be derived, after amplification as by a thyratron switching device, from the terminal 48 of FIG. 3. An anode resistor 52 is provided for the first triode stage of tube 50, while the common cathodes of the tube are connected through a resistor 53 to a floating bus 41 which is so designed to indicate that it is identical to the correspondingly numbered bus of FIG. 3. The anode of the second triode stage of tube 50 is connected to the control grid of the first stage through a condenser 54 and to the source +B through a resistor 56 which has an adjustable tap which is also connected to the source +B. Resistor 56 is shunted by a resistor 58. The second control grid of tube 50 is connected to the bus 41. A neon tube 60 is connected between the anode of the first stage of tube 50 and the bus 41 through a resistor 59. A resistor 61 is connected between the junction of tube 60 and resistor 59 and the source of operating voltage +B. A resistor 62 is connected between the first control grid of tube 50 and the operating voltage +B. The first anode of tube 50 is connected to an output terminal 63.

Circuit constants which can be used in the circuit of FIG. 4 are as follows:

Tube 50 _____ Type 12AU7.
Tube 60 _____ Type NE2.
Condenser 57 _____ 68 mmf.
Condenser 54 _____ 0.01 mf.
Resistor 62 _____ 1.5 megohms.
Resistor 52 _____ 30K.
Resistor 56 _____ 100K.
Resistor 58 _____ 220K.
Resistor 53 _____ 5K.
Resistor 59 _____ 470K.
Resistor 61 _____ 2.2 megohms.

Figure 5:
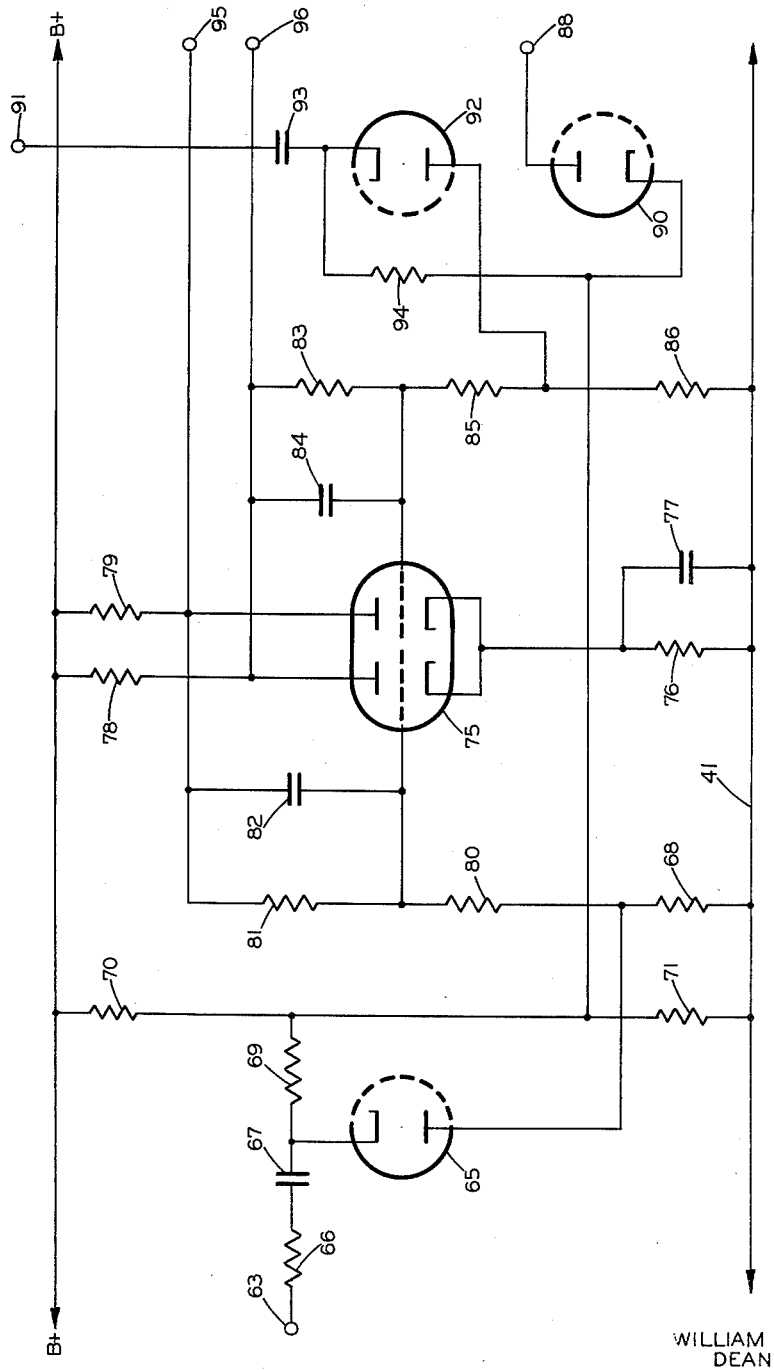

The circuit of FIG. 5 may be included in the block 15 of FIG. 1. The output signal from terminal 63 of the circuit of FIG. 4 may be applied to the correspondingly numbered elements of FIG. 5. A diode 65 is connected between the terminal 63 and the bus 41 through a circuit which includes a resistor 66, a condenser 67, diode 65, resistor 66, a condenser 67, diode 65, and a resistor 68. The cathode of diode 65 is connected through a resistor 69, to the common junction of a voltage divider which includes a resistor 70 and a resistor 71 connected between the source +B and the bus 41. A stage which includes a double triode 75 follows. A common cathode resistor 76, which is shunted by a condenser 77, is provided for tube 75. First and second anode resistors 78 and 79 are provided for the tube 75. The first grid of tube 75 is connected to the second anode of tube 75 through a parallel-connected resistor 81 and condenser 82. A voltage divider including a resistor 83 shunted by a condenser 84, a resistor 85, and a resistor 86 is connected between the first anode of tube 75 and the bus 41. The common junction of resistors 70 and 71 is connected to a terminal 88 through a diode 90. The common junction of resistors 85 and 86 is connected to a terminal 91 through a series connected diode 92 and condenser 93. A resistor 94 connects the cathode of diode 92 to the cathode of diode 90. The second anode of tube 75 is connected to a terminal 95, and the first anode of tube 75 is connected to a terminal 96.

Circuit constants which can be used in the circuit of FIG. 5 are as follows:

| | |
|---|---|
| Tubes 65, 90 and 92 | ½ 6AL5. |
| Tube 75 | 12AU7. |
| Resistors 66, 80 and 85 | 27K. |
| Resistors 69 and 94 | 1 megohm. |
| Resistors 70, 78 and 79 | 47K. |
| Resistor 71 | 4.7K. |
| Resistors 81 and 83 | 100K. |
| Resistors 68 and 86 | 18K. |
| Resistor 76 | 12K. |
| Condensers 67, 82 and 84 | 250 mmf. |
| Condensers 77 and 93 | 0.01 mf. |

Figure 6:
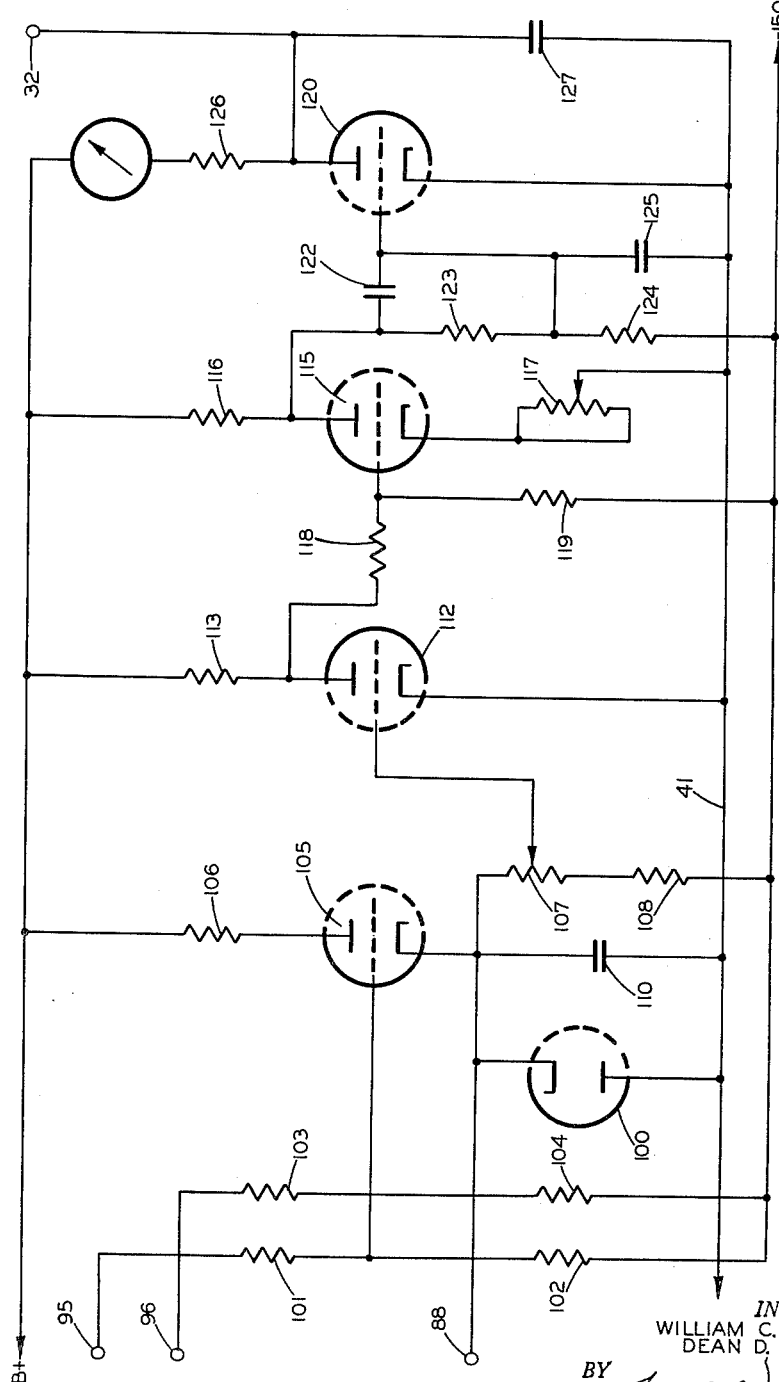

The circuit of FIG. 6 may be included in the block diagram 18 of FIG. 1. Terminals which correspond to other terminals of FIG. 3 and FIG. 5 have been given identical reference numerals. The bus 41 of course corresponds to that previously mentioned. Thus, a diode 100 is connected between terminal 88 and bus 41. Terminal 95 is connected through series-connected resistors 101 and 102 to a source of operating voltage −150 v. Terminal 96 is connected to the same source through series-connected resistors 103 and 104. A triode 105 has its grid connected to the common junction of resistors 101 and 102; has its anode connected to the source +B through a resistor 106, and has its cathode connected to the source −150 v. through series-connected resistors 107 and 108. A condenser 110 is connected in parallel with diode 100. The grid of a triode 112 is connected to an adjustable tap on resistor 107. The anode of tube 112 is connected to the source of operating voltage +B through a resistor 113, while its cathode is connected to the bus 41. Tube 112 is followed by another triode stage which includes tube 115 having an anode resistor 116 and a resistor 117 having each end connected to the cathode of tube 115 and an adjustable tap connected to the bus 41. The grid of tube 115 is connected to the anode of tube 112 through a resistor 118 and to the source −150 v. through a resistor 119. The anode of tube 115 is connected to the grid of another triode 120 through a condenser 122 and to the source of operating voltage −150 v. through series-connected resistors 123 and 124. Condenser 122 is connected across resistor 123. Condenser 125 is connected from the grid of tube 120 to bus 41. An anode resistor 126 is provided for tube 120. The anode of tube 120 is connected directly to terminal 32 and to the bus 41 through a condenser 127.

Circuit constants which can be used in the circuit of FIG. 6 are as follows:

| | |
|---|---|
| Tube 100 | ½ 6AL5. |
| Tubes 105, 112, 115 and 120 | ½ 12AT7. |
| Resistors 101, 103, 118 119, 123 and 124 | 220K. |
| Resistor 102 | 330K. |
| Resistors 104 and 106 | 270K. |
| Resistor 107 | 100K. |
| Resistor 108 | 750K. |
| Resistors 113 and 116 | 68K. |
| Resistor 117 | 25K. |
| Resistor 126 | 1 megohm. |
| Condenser 110 | 40 mf. |
| Condenser 125 | 1.0 mf |
| Condenser 127 | 0.1 mf. |
| Condenser 122 | 0.05 mf. |

While there has been described what is presently considered to be the preferred embodiment of the invention, it will be obvious to those skilled in the art that various changes and modifications may be made therein without departing from the invention, and it is therefore aimed, in the appened claims, to cover all such changes and modifications as fall within the true spirit and scope of the invention.

What is claimed is:

1. A device for measuring a length dimension in a substance moving in a predetermined path with a variable velocity comprising, marking means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing on the other hand for causing said marking means to provide another point of reference in said substance after a time delay which is dependent upon the velocity of movement of said point of reference in said path to adjust the measured values for the velocity variations of said substance, and means for counting the points sensed by said sensing means to determine said length dimension in said predetermined path.

2. A device for measuring a length dimension in a substance moving in a predetermined path with a variable velocity comprising, marking means for providing a point of reference having a predetermined space relationship in said substance with respect to said marking means, sensing means for sensing said point of reference after a time T when said point has a predetermined spacing in said path from the position at which said point of reference was provided by said marking means, means responsive to each such point sensed by said sensing means as relative motion in said path is provided between said substance on the one hand and said marking means and said sensing means on the other hand for causing said marking means to provide another point of reference in said substance after a time $t$ when $t$ is such an interval that $$\frac{T+t}{t}$$

is a constant, and means for counting the points sensed by said sensing means to determine said length dimension in said predetermined path.

3. A device for measuring a length dimension in a predetermined path in a substance comprising, marking means having an inherent time delay for providing a point of reference having a predetermined space relationship in said substance with respect to said marking means, sensing means having an inherent time delay for sensing said point of reference when said point has a predetermined spacing in said path from the position at which said point of reference was provided by said marking means, means responsive to each point sensed by said sensing means as relative motion is provided between said substance on the one hand and said marking means and said sensing means on the other hand for adjusting the total time delay of the system and for causing said marking means to provide another point of reference in said substance with said adjusted time delay, and means for counting the points sensed by said sensing means to determine said length dimension in said predetermined path with an accuracy which is compensated at all values of said relative motion.

4. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, and means dependent upon the velocity of movement of said point of reference for introducing additional time delay into said system for compensating for the effect of variations in the speed of said relative motion on the accuracy of said measured length dimension.

5. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, and means dependent upon the velocity of movement of said point of reference for introducing additional timed elay into said system for compensating for the effect of variations in the speed of said relative motion on the accuracy of said measured length dimension and which provides a maximum time delay which is sufficient to compensate for the maximum normal amount of decrease in the speed of said relative motion on the accuracy of said measured length dimension.

6. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, means for introducing additional time delay into said system, and means for controlling said last-named means directly in accordance with decreases in the speed of said relative motion to compensate for the effect of said decreases on the accuracy of said measured length dimension.

7. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, means for introducing additional time delay into said system, and means for controlling said last-named means inversely in accordance with variations in the speed of said relative motion to compensate for the effect of said variations on the accuracy of said measured length dimension.

8. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, means for introducing additional time delay into said system, and means dependent upon the number of points sensed by said sensing means during a given time interval for controlling said means for introducing additional time delay to compensate for the effect of variations in the speed of said relative motion on the accuracy of said length dimension.

9. A device having an inherent system time delay for measuring a length dimension in a predetermined path in a substance comprising, means for providing a point of reference having a predetermined space relationship in said substance with respect to said marking means, sensing means for sensing said point of reference when said point has a predetermined spacing in said path from the position at which said point of reference was provided by said marking means, means responsive to each point sensed by said sensing means as relative motion in said path is provided between said substance on the one hand and said marking means and said sensing means on the other hand for causing said marking means to provide another point of reference in said substance, means for counting the points sensed by said sensing means to determine said length dimension in said given path, means for introducing additional time delay into said system, and means for integrating the points sensed by said sensing means over a given time interval for controlling said means for introducing additional time delay to compensate for the effect of variations in the speed of said relative motion on the accuracy of said length dimension.

10. A device for measuring a length dimension in a magnetizable substance moving in a predetermined path with a variable velocity comprising, a magnetic recording head for magnetizing a point of reference in said substance adjacent said magnetic recording head, a magnetic receiving head for sensing said magnetized point of reference when said point has a predetermined spacing in said path from said recording head, means responsive to each point sensed by said receiving head as relative motion in said path is provided between said substance on the one hand and said recording head and said receiving head on the other hand for causing said recording head to magnetize another point of reference in said substance after a time delay which is dependent upon the velocity of movement of said point of reference in said path to adjust the measured values for the velocity variations of said substance, and means for counting the magnetized points sensed by said receiving head to determine said length dimension in said substance.

11. A device for measuring the length of a piece of a magnetizable strip material moving in a predetermined path with variable velocity comprising, a magnetic recording head adjacent said material for providing a magnetized point of reference in said material, a magnetic play-back head for sensing said magnetized point of reference when said point has a predetermined spacing from the position at which said point was magnetized, means responsive to each point sensed by said play-back head as said strip is driven to cause said magnetized points to move from said recording head to said play-back head during a time interval T for causing said recording head to magnetize another point of reference in said material after a time interval $t$, where $t$ is such an interval that $$\frac{T+t}{t}$$

is a constant, and means for counting the magnetized points in said strip sensed by said play-back head to determine said length dimension in said predetermined path.

References Cited in the file of this patent

UNITED STATES PATENTS

| | | |
|---|---|---|
| 2,488,277 | Falk et al. | Nov. 15, 1949 |
| 2,581,209 | Shepard et al. | Jan. 1, 1952 |